United States Patent [19]

Snetsinger et al.

[11] 4,086,365
[45] Apr. 25, 1978

[54] METHOD OF FEEDING LAYING HENS

[75] Inventors: David C. Snetsinger; Ray A. Zimmerman, both of St. Louis, Mo.

[73] Assignee: Ralston Purina Company, St. Louis, Mo.

[21] Appl. No.: 735,711

[22] Filed: Oct. 26, 1976

[51] Int. Cl.² ............................................. A23K 1/00
[52] U.S. Cl. ...................................... 426/2; 426/657; 426/807
[58] Field of Search ...................... 426/74, 2, 72, 807, 426/656, 623, 630, 635, 657

[56] References Cited

PUBLICATIONS

Patel et al., "Effect of Restricted Feeding Time on Feed Consumption Egg Production and Body Weight Gain of Leghorn Pullets," Poultry Science 49 pp. 1425 (1970).

Gerry et al., "Performance of Red X Rock Sex Linked Hens Subjected to Restricted Feeding During the Laying Period," Poultry Science, vol. 55, pp. 1941–1946 (1976).

Emerson, "Simple Cost-Effective Layer Feeding Program Developed," Feedstuffs pp. 13–14, Oct. 22, 1975.

Gross, "Study Shows Effects of Lowering Layer Protein," Feedstuffs, p. 16, Nov. 29, 1976.

*Primary Examiner*—R. B. Penland
*Attorney, Agent, or Firm*—W. Dennis Drehkoff

[57] ABSTRACT

This invention relates primarily to innovations in methods of feeding laying hens wherein the hens' nutrient reserves and specialized nutritious feeds are utilized so that a uniform rate of egg production can be maintained at substantial economic savings. More specifically, it concerns a feeding program wherein laying hens are fed a ration with vitamins, minerals and a specific low total crude protein for an effective amount of time to reduce the hens' nutrient reserves without reducing their rate of lay and total feed efficiency. The hens are then fed a ration adequate in total crude protein, vitamins and minerals for the remaining feeding time to replenish the nutrient reserves in an efficient manner while maintaining optimum egg production and other performance characteristics.

20 Claims, No Drawings

METHOD OF FEEDING LAYING HENS

BACKGROUND OF THE INVENTION

Today's high cost of grain and protein sources have caused poultrymen to re-examine feeding programs for commercial laying hens. Methods of feeding layers are sought which will substantially lower feed costs but yet provide adequate nutrient intake for maintaining egg production, size, quality and feed efficiency.

Investigations studying the utilization of nutrients by laying hens have taken many approaches: by limiting the quantity of feed given; restricting the feeding time; or limiting the amount of energy in the diet. A 20% reduction in feed consumption by reducing the feeding time was shown in an article by Bell and Morenz, *Poultry Science* 52: (1973) pp 982–991. Accompanying the reduced feed consumption was reduced egg production. A 10 to 15% reduction in feed consumption without affecting egg production was described in an article by Patel and McGinnis, Poultry *Science* 49: (1970) page 1425, while a 6% reduction of energy intake but not amino acids, minerals or vitamins resulted in an increase in egg production as seen in a report by Snetsinger, Zimmerman and Greene, in *Poultry Science* 53: (1974) page 1980. A report in *Poultry Science* 55 page 1941, (1976) shows a restriction of feed intake to 95, 90 or 85% of the amount consumed by full-fed controls to decrease egg production with a corresponding decrease in the level of feed intake.

Other researchers have studied the level of nutrients to provide optimum levels of performance (growth or rate of lay, egg size, etc.). While such determined levels may provide optimum nutrition and performance, they do not necessarily provide optimum economic returns to the poultry producer.

For growing animals it has been found that it is desirable to feed rations of different but adequate nutritional levels associated with the changing requirement for nutrients throughout the growing period. In practice, this means feeding a ration that is slightly deficient in amino acids during an early stage of that particular section of the growing period. Later, because of the animal's changing nutritional requirements, this ration is more than adequate and the growing animal or bird compensates by growing faster during a subsequent growth and feeding period. Thus, in meeting a growing animal's needs on a practical basis a series of rations that are alternately adequate and then deficient are provided to achieve economical and efficient growth rates.

Critical factors which influence the rehabilitation and compensatory growth after a period of undernutrition are the severity of the deficiency, the duration of the deficiency and age at the onset of the period of undernutrition and the particular species involved.

The aforementioned method of feeding can only provide economic savings if the animals are growing and have a decreasing amino acid, vitamin and mineral requirement. However, this feeding method cannot be utilized by mature animals, especially laying hens because their nutritional requirements are not diminishing and any continuous restriction of dietary intake of protein, vitamins or minerals could cause detrimental effects on body weight, egg size, egg production and feed efficiency.

There is a need for an economical method of feeding laying hens to promote the formation of egg protein without substantial monitoring cost and equipment as well as any detrimental effects on rate of lay or total feed efficiency.

SUMMARY OF THE INVENTION

Accordingly, it is an object of the present invention to provide a method of feeding laying hens a specialized ration which affords economic savings to the commercial egg producer in a prescribed feeding program that does not detrimentally affect rate of lay or total feed efficiency. Another object of the present invention is to provide a method of feeding laying hens whereby the efficiency of food utilization is increased.

These and other objects are accomplished according to the present invention which provides an improved method of feeding laying hens wherein the nutrient reserves of the hens are utilized for egg formation. These nutrient reserves along with the nutrients in a special low nutrient fortified ration provide the hens with sufficient nutrients to produce eggs with no loss in the rate of production for a limited period of time. Prior to the time that any loss of production takes place, the hens are then fed a highly fortified ration. The nutrient reserves are replenished in a highly efficient manner and the hens continue to lay at a normal rate of production. The hens are then placed on a low fortified ration and the cycle is repeated. The method of the present invention comprises feeding laying hens a ration low in total crude protein and other specified nutrients for an effective amount of time to reduce the hens' nutrient reserves without a loss in performance, and then feeding a ration containing a nutritionally adequate level of total crude protein and specified vitamins and minerals for an effective amount of time.

DETAILED DISCUSSION

This invention is based upon the discovery that laying hens can be provided with a specialized two-ration feeding method in which the hens' nutrient reserves are reduced and subsequently replenished to promote the production of egg protein at economical savings.

Those skilled in the art are aware that laying hens have reserves of most nutrients stored within their bodies. The level of these nutrients vary depending upon the specific nutrient involved. The reserves have a minimal functional purpose if the hens are on a sound nutritional feeding program. The nutrients pertinent to this invention consist mainly of amino acids, vitamins and minerals and are stored in various anatomical locations within the body of the hen. Particularly, the amino acids are found in the liver, body fluids, and musculature; while the minerals, specifically phosphorus and calcium are in the bones and body fluids and the vitamins are found in the liver, blood and other body fluids and tissues.

According to the invention, short term use of the hens' reserves can be made for egg production and other body functions without a loss in egg production rate or feed efficiency. The nutrient reserves of a mature hen are reduced for a relatively short time without reducing the hens' performance including rate of lay, weight and food utilization. Preferably, this reduction should comprise about 25% of the total feeding period, up to a limit of 7 consecutive days out of 28 days. Subsequently, the nutrient reserves are replenished with an adequate diet. According to this feeding method, it has been found that the utilization of dietary nutrients is done on a more efficient basis than if the reserves had not been depleted. This cyclic feeding of alternately a low fortified and high fortified ration can be accomplished on a continuous basis and no significant performance loss results in either egg production or feed efficiency as measured by egg mass per hen per day or pounds of feed per pound of egg. Whereas, if a deficient ration is fed on a continuous basis to mature hens a noted performance loss is evidenced by no body weight gain or body weight loss, loss in production rate and/or feed efficiency and egg size.

In the practice of this invention, the laying hens are placed on a specialized dietary feeding method which includes a low fortified ration of amino acids, specified vitamins and minerals containing an effective amount, usually from about 10 to 12% by weight of total crude protein and a highly fortified ration of amino acids, vitamins and specified minerals containing an effective amount, usually from about 14 to 18% by weight of total crude protein. Since the reserves of each nutrient vary, the level of the nutrients reduced in the low fortified ration are very important. Similarly, the length of time that the nutrient reserves are reduced is of importance as well as the percent of time that the birds are on the deficient ration. The program is designed so that the reserves of any specific nutrient within the hen are not excessively reduced for the designated feeding period involved. Typical ingredients of a low fortified ration that can be utilized in the practice of the present invention are: grain products, processed grain-by-products, plant protein products, animal protein products, dehydrated alfalfa meal, cane molasses, vitamin B-12 supplement, vitamin A supplement, animal fat preserved with BHA, BHT (a preservative), methionine, calcium, choline chloride, calcium pantothenate, niacin, riboflavin supplement, D activated animal sterol, folic acid, menadione dimethylpyrimidinol bisulfite (source of vitamin K activity), defluorinated phosphate, calcium carbonate, iodized salt, mangonous oxide, copper sulfate, zinc oxide. A typical formulation should include gross amounts of protein, vitamins and minerals, shown in the following Table I — percentages are by weight.

TABLE I

| TYPICAL ANALYSIS | |
|---|---|
| Crude protein not less than | 10.0% |
| Crude fat not less than | 3.0 |
| Crude fiber not more than | 4.5 |
| Calcium (Ca) not less than | 2.8 |
| Calcium (Ca) not more than | 3.8 |
| Phosphorus (P) not less than | 0.55 |
| Iodine (I) not less than | 0.0001 |
| Salt (NaCl) not less than | 0.3 |
| Salt (NaCl) not more than | 0.9 |

The low fortified ration should contain only about 10 to about 12% by weight crude protein which permits the hen's nutrient reserves, particularly the amino acids found in the liver, musculature, blood and other body fluids to be utilized in the formation of egg protein. Additionally, the low fortified ration has a fixed level containing nutritionally balancing amounts of specified vitamins and minerals involved in egg shell formation. For example, the dietary calcium and vitamin D remain at normal levels in nutritionally balancing amounts known to those skilled in the art.

Typical ingredients of a highly fortified ration are: grain products, processed grain by-products, plant protein products, animal protein products, forage products, cane molasses, vitamin B-12 supplement, animal fat preserved with BHA, methionine, calcium, choline chloride, folic acid, calcium pantotheneate, niacin, choline chloride, folic acid, calcium pantotheneate, niacin, riboflavin supplement, vitamin A supplement, D activated sterol, menadione dimethylpyrimidinol bisulfite (source of vitamin K activity), defluorinated phosphate, magnesium sulfate, potassium sulfate, calcium carbonate, iodized salt, manganous oxide, copper sulfate, zinc oxide.

A typical formulation should include the gross amounts of protein vitamins and minerals shown in the following Table II, in percentages by weight.

TABLE II

| TYPICAL ANALYSES | |
|---|---|
| Crude Protein not less than | 14.0% |
| Crude fat not less than | 3.0 |
| Crude fiber not more than | 4.5 |
| Calcium (Ca) not less than | 3.1 |
| Calcium (Ca) not more than | 4.1 |
| Phosphorus (P) not less than | 0.55 |
| Iodine (I) not less than | 0.0001 |
| Salt (NaCl) not less than | 0.3 |
| Salt (NaCl) not more than | 0.9 |

The highly fortified ration should contain about 14 to about 18% by weight crude protein and nutritionally balancing amounts of vitamins and minerals.

Laying hens feed intake may vary due to environmental temperatures. Therefore, the foregoing rations are seasonally adjusted in their amino acids, vitamin and mineral levels to avoid performance loss. This is accomplished by changing the level of amino acids, vitamins and minerals in relationship to the energy content of the ration. Hens generally consume food to meet their energy requirements, that is, after meeting her daily energy need, the hen will stop eating. However, if she stops eating before she fulfills her amino acid requirements, then her performance will suffer. When formulating a feed for layers it is important to insure there is a proper relationship of the amino acid content of the ration to the energy level found therein. The amino acid requirements have to be maintained in conjunction with the energy requirements so that the hen's total nutritional requirement can be satisfied simultaneously. Additionally, vitamins and minerals should be balanced in the ration to correlate with the energy requirements of the hen. High energy rations need higher percentages of amino acids thus increasing the total crude protein content of the ration while in lower energy rations, lower amino acid levels creating lower total crude protein can be effectively utilized. A hen actually requires the same level of amino acid intake per day per a given state of production regardless of the temperature. In the warm weather months a hen expands less energy and accordingly she lowers her feed intake. If the crude protein, amino acid, vitamin and mineral content of the ration is not increased in the warm weather months, a hen will consume low levels of these ingredients and would not meet her needed nutritional requirements and at the same time exhibit a decrease in her egg production. A skilled worker in the art would be able to adjust the crude protein, amino acid, vitamin and mineral content accordingly. For example, the highly fortified ration shown in Table II could be adjusted to contain about 20% more vitamins, minerals and amino acids to fulfill the nutritional needs of the hens. The low fortified ration would also be adjusted. This adjustment is not intended to limit the present invention for ingredient adjustments are known in the art and should be within the knowledge of a skilled worker. During the cold weather months the hen requires more energy and increases her feed intake-hereby consuming more crude protein, amino acid, vitamins and minerals than are needed for a given state of egg production. This causes an increase in the cost per dozen eggs and is economically unsuitable to the egg farmer. If the ingredients of the ration are adjusted to the point where optimum egg production is efficiently obtained without a surplusage of ingredients, there should be economic savings. The adjustment is to lower the crude protein and amino acid levels of the ration so that when the hen increases her consumption of food, she still receives the same level of each of the essential amino acids the year around for efficient egg production. This is within the skill of a worker in the art and is not intended to limit the present invention.

Crude protein in this invention refers to the total protein in the ration as expressed by the Kjeldahl Method of Analysis. For example, the total nitrogen content of a ration is multiplied by the factor 6.25 to obtain the total crude protein content of the ration. Typically, components of animal rations which contain nitrogen are the amino acids found in plant and animal protein sources. Some of these plant and animal protein sources include soybean meal, meat meal, corn, milo, meat by-products meal, feather meal, etc. This listing is not intended to limit the invention for any protein sources familiar to those skilled in the art can be utilized in the present invention. The crude protein content of the rations used in the method of the instant invention can be easily controlled by regulating the essential amino acid content of the formulation. This method of lowering the crude protein content of the foregoingly described formulation is not intended to be limiting for those skilled in the art can effectively accomplish the same results by controlling nitrogen containing components in the formulation to therefore adjust the crude protein level. Additionally, completely synthetic amino acids which can be used in the instant invention to control the crude protein level. However, synthetic amino acids are generally quite expensive and their presence in the ration would increase its cost, therefore, it is not feasible to extensively use synthetic amino acids in the present invention until the cost is justified.

A facile method of controlling the total crude protein content of the two rations utilized in the instant invention is to regulate the essential amino acids that are found within each ration for optimum performance. For example, but by no means limiting, one skilled in the art could regulate the amounts of such essential amino acids as cystine, lysine, isoleucine, methionine and tryptophan to form the low fortified feed or the high fortified feed used in the instant invention though the use of proteinaceous ingredients such as corn (9% protein) or soybean meal (44% protein) and/or economical synthetic amino acids.

Notwithstanding the foregoing formulations, a critical feature of the present invention resides in the time of feeding the specialized rations. Each particular ration should be fed for a limited length of time to insure maximum performance. The ration of low fortification should be fed to the laying hens up to 25% of the time up to 7 consecutive days duration. Longer periods of continuous feeding of the ration could and eventually would result in reduced performance. Shorter periods than the 25% of the time will reduce the feed costs savings. In practice of the invention, 25% of the time can be defined as feeding one load of the low fortified ration in four, providing of course, that it is fed no longer than 7 days before starting the highly fortified ration. The ration of high fortification should be fed after the low fortified ration until the end of the feeding period which amounts to about 75% of the total feeding time. For example, the low nutrient content feed could be fed 4 days with the high nutrient content fed 10 days. Further, feeding the low fortified ration 7 out of 28 days has provided the desired unexpected result of high performance in egg production.

Before commencing the feeding method of the present invention it is preferable to have the sexually mature laying hens producing eggs that are about 65 to 70% "Large" and above, according to the regulations of the United States Department of Agriculture concerning the grading and weight classes of shell eggs found at 7 CFR Sec. 56. Usually hens experience their highest rate of lay at 28 to 29 weeks of age, however the egg size does not reach a high level of "Large" category eggs until the hens are about 35 to 40 weeks of age, depending on the breed of layer. There is some egg size loss with the feeding method of the invention which may amount to about 1 ½% of the normal egg weight. However, this egg size loss has a negligible economic effect under existing USDA regulations once the eggs are classified in the "Large" or "Extra Large" category because there is a very little economic premium, if any, for the "Extra Large" eggs. However, prior to the time the laying hens produce eggs of the "Large" size a slight loss in egg size will result in more "Medium" and "Small" size eggs which the price differential between sizes is greater.

The following examples disclose a number of practical embodiments of the invention which serve to illustrate the invention and suggest other similar embodiments to those skilled in the art.

EXAMPLE 1

An alimentary composition was formulated with typical ingredients as shown in Table I having a crude protein content of 11.3% by weight. This low fortified ration was fed to 480 laying hens to determine its effect on layer performance and egg composition. Additionally, the hens were fed one of two high nutrient fortified reserves. The high nutrient fortified rations were formulated from typical ingredients as shown in Table II and contained 15.2% and 14% protein respectively.

TABLE III

| Crude Protein Content | 15.2% | 14% | 11.3% |
| --- | --- | --- | --- |
| Days On Treatment | Egg Mass Per Hen Per Day In Grams | Egg Mass Per Hen Per Day In Grams | Egg Mass Per Hen Per Day In Grams |
| Pretest Standard | 45.7 | 43.6 | 44.5 |
| 1–7 | 45.4 | 44.3 | 44 |
| 8–14 | 46.1 | 43.9 | 41.0 |

As shown in the foregoing table, egg mass per hen per day is drastically reduced in the low fortified ration after the seven day period. The high fortified rations should be fed to the laying hens after the hens have been on the low fortified ration for not longer than seven consecutive days.

EXAMPLE 2

In further testing to determine the optimum feeding time and formulations for the depletion and repletion program, 900 laying hens were fed rations similar to the composition as shown in Example 1. Ration A contain 15.2% protein while ration B and C contain 11.5 and 10.9% protein respectively. The lower fortified rations were fed approximately 1/4 of the time in this experiment which yielded an increased production rate, improved feed efficiency, reduced egg and body weight. The low fortified ration was fed for a period of 2, 4 and 7 days while the highly fortified ration was fed for periods of 5, 10 and 21 days, respectively. It was found that there were no differences in performance as shown in Table IV.

TABLE IV

Crude protein:Ration
A = 15.2%
B = 11.5%
C = 10.9%

| Experimental Rations Depletion | Repletion | Days of Depletion/Repletion | Hen Day Production, % | Egg Wt., g | Feed/ Dz., lb | Body Weight, lbs |
|---|---|---|---|---|---|---|
| A | A | 0/14 | 44.6 | 66.0 | 5.80 | 3.74 |
| B | B | 0/14 | 41.4 | 64.3 | 6.01 | 3.46 |
| C | C | 0/14 | 41.0 | 62.7 | 5.69 | 3.21 |
| B | A | 2/5 | 45.8 | 65.3 | 5.66 | 3.66 |
| C | A | 2/5 | 46.3 | 64.6 | 5.47 | 3.62 |
| B | A | 4/10 | 48.0 | 64.8 | 5.36 | 3.67 |
| C | A | 4/10 | 46.6 | 65.5 | 5.57 | 3.59 |
| B | A | 7/21 | 46.6 | 65.7 | 5.53 | 3.60 |
| C | A | 7/21 | 46.6 | 64.5 | 5.37 | 3.54 |
| Average B | A | — | 46.8 | 65.2 | 5.51 | 3.64 |
| Average C | A | — | 46.5 | 64.9 | 5.47 | 3.58 |
| Average — | — | 2/5 | 46.0 | 64.9 | 5.47 | 3.64 |
| Average — | — | 4/10 | 47.3 | 65.1 | 5.46 | 3.63 |
| Average — | — | 7/21 | 46.6 | 65.1 | 5.45 | 3.57 |

As can be seen from the preceding Table, there was essentially no significant performance loss with the depletion ration having the lowest protein content, ration C or in any other ration.

It is to be understood that while only a limited number of rations for carrying on the present invention have been illustrated and described in detail herein, numerous variations or modifications thereof may occur to those having skill in this art and what is intended to be covered herein is not only the method associated with the illustration of the limited number of rations, but also any and all modified forms thereof as may come within the spirit and scope of the invention herein disclosed.

What is claimed is:

1. A method of feeding laying hens wherein nutrient reserves of said hens are reduced and replenished by the efficient utilization of dietary nutrients to promote the formulation of egg protein, which comprises:
    feeding a first ration with an effective amount of crude protein and nutritionally balancing amounts of vitamins and minerals for an effective amount of time to reduce the hens' nutrient reserves without reducing their performance, and
    feeding a second ration with an effective amount of crude protein and nutritionally balancing amounts of vitamins and minerals for an effective amount of time to replenish the hens' nutrient reserves to produce optimum egg production.

2. The method of claim 1 wherein the first ration comprises from 10 to 12% crude protein by weight.

3. The method of claim 1 wherein the second ration comprises from 14 to 18% crude protein by weight.

4. The method of claim 1 wherein the first ration is fed to said hens up to 25% of the feeding time.

5. The method of claim 1 wherein the first ration is fed to said hens for not more than seven days.

6. The method of claim 1 wherein the second ration is fed to said hens for about 75% of the feeding time.

7. A method of feeding laying hens wherein nutrient reserves of said hens are reduced and replenished by the efficient utilization of dietary nutrients to promote the formulation of egg protein, which comprises:
    feeding a first ration comprising about 10 to about 12% by weight of crude protein and nutritionally balancing amounts of vitamins and minerals for an effective amount of time to reduce the hens' nutrient reserves without reducing their performance, and
    feeding a second ration with an effective amount of crude protein and nutritionally balancing amounts of vitamins and minerals for an effective amount of time to replenish the hens' nutrient reserves to produce optimum egg production.

8. The method of claim 7 wherein the second ration comprises from about 14 to about 18% crude protein by weight.

9. The method of claim 7 wherein the first ration is fed to said hens up to 25% of the feeding time.

10. The method of claim 7 wherein the first ration is fed to said hens for not more than seven days.

11. The method of claim 7 wherein the second ration is fed to said hens for about 75% of the feeding time.

12. A method of feeding laying hens wherein nutrient reserves of said hens are reduced and replenished by the efficient utilization of dietary nutrients to promote the formulation of egg protein, which comprises:
    feeding a first ration with an effective amount of crude protein and nutritionally balancing amounts of vitamins and minerals for an effective amount of time to reduce the hens' nutrient reserves without reducing their performance, and
    feeding a second ration comprising about 14 to 18% crude protein by weight and nutritionally balancing amounts of vitamins and minerals for an effective amount of time to replenish the hens' nutrient reserves to produce optimum egg production.

13. The method of claim 12 wherein the first ration comprises from 10 to 12% crude protein by weight.

14. The method of claim 12 wherein the first ration is fed to said hens up to 25% of the feeding time.

15. The method of claim 12 wherein the first ration is fed to said hens for not more than seven days.

16. The method of claim 12 wherein the second ration is fed to the hens for about 75% of the feeding time.

17. A method of feeding laying hens wherein nutrient reserves of said hens are reduced and replenished by the efficient utilization or dietary nutrient to promote the formation of egg protein, which comprises:

feeding the first ration with an effective amount of crude protein and nutritionally balancing amounts of vitamins and minerals for up to 25% of the feeding time to reduce the hens' nutrient reserves without reducing their performance, and feeding a second ration with an effective amount of crude protein and nutritionally balancing amounts of vitamins and minerals for up to 75% of the feeding time to replenish the hens' nutrient reserves to produce optimum egg production.

18. The method of claim 17 wherein the first ration comprises from about 10 to about 12% crude protein by weight.

19. The method of claim 17 wherein the second ration comprises from about 14 to about 18% crude protein by weight.

20. A method of feeding laying hens wherein nutrient reserves of said hens are reduced and replenished by the efficient utilization of dietary nutrients to promote the formation of egg protein which comprises:

feeding a first ration comprising about 10 to about 12% by weight of crude protein and nutritionally balancing amounts of vitamins and minerals for up to 25% of the feeding time to reduce the hens' nutrient reserves without reducing their performance, and feeding a second ration comprising about 14 to 18% crude protein by weight and nutritionally balancing amounts of vitamins and minerals for up to about 75% of the feeding time to replenish the hens' nutrient reserves to produce optimum egg production.

* * * * *